United States Patent
Hsu (10) Patent No.: US 8,959,716 B2
(45) Date of Patent: Feb. 24, 2015

(54) DOUBLE-SHAFT TYPE ROTARY SHAFT PIVOTAL POSITIONING STRUCTURE

(71) Applicant: First Dome Corporation, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 13/895,439

(22) Filed: May 16, 2013

(65) Prior Publication Data

US 2014/0290008 A1    Oct. 2, 2014

(30) Foreign Application Priority Data

Mar. 27, 2013    (TW) .............................. 102205624 U (51) Int. Cl.
| | | |
|---|---|---|
| E05D 11/08 | (2006.01) | |
| E05D 3/06 | (2006.01) | |
| E05D 11/06 | (2006.01) | |
| G06F 1/16 | (2006.01) | |

(52) U.S. Cl.
CPC .............. *E05D 3/06* (2013.01); *E05Y 2201/62* (2013.01); *E05D 11/06* (2013.01); *G06F 1/1681* (2013.01); *G06F 1/162* (2013.01); *G06F 1/1618* (2013.01)
USPC ................................. 16/302; 16/366; 16/342

(58) Field of Classification Search
CPC ..... G06F 1/1681; G06F 1/1616; G06F 1/162; G06F 1/1618; E05D 11/082; E05D 3/06; E05Y 2201/62
USPC ........... 16/302, 366, 337, 338, 339, 340, 341, 16/342
See application file for complete search history.

(56) References Cited

U.S. PATENT DOCUMENTS

| | | | | |
|---|---|---|---|---|
| 5,697,125 | A * | 12/1997 | Gannon ........................... | 16/342 |
| 6,253,419 | B1 * | 7/2001 | Lu .................................... | 16/340 |
| RE37,712 | E * | 5/2002 | Gannon .......................... | 16/342 |
| 7,607,202 | B1 * | 10/2009 | Lee .................................. | 16/342 |
| 7,958,600 | B2 * | 6/2011 | Kuo et al. ....................... | 16/342 |
| 8,230,554 | B2 * | 7/2012 | Chu et al. ........................ | 16/337 |
| 8,245,356 | B2 * | 8/2012 | Chu et al. ........................ | 16/342 |
| 8,448,297 | B2 * | 5/2013 | Chen ............................... | 16/342 |
| 8,578,561 | B2 * | 11/2013 | Chuang .......................... | 16/366 |

(Continued)

FOREIGN PATENT DOCUMENTS

| | | |
|---|---|---|
| TW | M430816 U1 | 6/2012 |
| TW | M436744 U1 | 9/2012 |

*Primary Examiner* — Jeffrey O Brien
(74) *Attorney, Agent, or Firm* — Rosenberg, Klein & Lee (57) ABSTRACT

A double-shaft type rotary shaft pivotal positioning structure includes an elastic guide assembly and two pivot shafts. The elastic guide assembly includes two containing portions which are outwardly communicated and formed with two opposite elastic arms and two corresponding planed press-contact sides. The pivot shafts are respectively centrally provided with center section portions that are utilized to respectively enter the containing portions of the elastic guide assembly and each of which includes a periphery provided with two center section planed surfaces capable of being pressingly contacted with the press-contact sides of the elastic guide assembly. When the pivot shafts are synchronously pivoted close to a preset positioning angle, the center section planed surfaces of the pivot shafts are capable of rotatably attaching toward the press-contact sides of the elastic guide assembly, thereby enabling the pivot shafts to approach and be positioned at the preset positioning angle.

36 Claims, 5 Drawing Sheets

(56) References Cited

U.S. PATENT DOCUMENTS

| | | | |
|---|---|---|---|
| 2002/0144378 A1* | 10/2002 | Liao | 16/342 |
| 2002/0162192 A1* | 11/2002 | Su-Man | 16/337 |
| 2007/0094845 A1* | 5/2007 | Chang et al. | 16/342 |
| 2007/0101543 A1* | 5/2007 | Lu et al. | 16/342 |
| 2007/0283534 A1* | 12/2007 | Chang et al. | 16/342 |
| 2008/0134468 A1* | 6/2008 | Chen et al. | 16/340 |
| 2008/0307608 A1* | 12/2008 | Goto | 16/366 |
| 2009/0000062 A1* | 1/2009 | Yamanami | 16/366 |
| 2009/0013500 A1* | 1/2009 | Ueyama et al. | 16/354 |
| 2010/0071159 A1* | 3/2010 | Myung | 16/303 |
| 2011/0146159 A1* | 6/2011 | Zhang et al. | 16/341 |
| 2011/0232032 A1* | 9/2011 | Chu et al. | 16/221 |
| 2011/0232034 A1* | 9/2011 | Chu et al. | 16/297 |
| 2011/0265288 A1* | 11/2011 | Chiang | 16/341 |

* cited by examiner

DOUBLE-SHAFT TYPE ROTARY SHAFT PIVOTAL POSITIONING STRUCTURE

BACKGROUND OF THE INVENTION

1. Field of the Invention

The invention relates to a double-shaft type rotary shaft pivotal positioning structure, in particular relates to a positioning structure utilized to produce an elasticity for guidance when two rotary shafts capable of performing synchronous reverse rotation is pivoted close to a preset positioning angle, enabling the two rotary shafts to be positioned at a preset opening angle.

2. Description of the Related Art

In conventional electronic products (e.g., notebook computers) including a pivotal portion (e.g., a screen) and a relative pivotal portion (e.g., a host) that are provided for performing a mutual pivotal opening process, it is generally that two ends of a single pivotal shaft are utilized to respectively join to the pivotal portion and the relative pivotal portion. For example, in utility model patents cases such as 'Rotary shaft' of Taiwan Patent Publication Number M436744 and 'Pivot shaft' of Taiwan Patent Publication Number M430816, two typical rotary (pivot) shafts with different single shafts are disclosed, in which a pivotal portion (e.g., a screen) and a relative pivotal portion (e.g., a host) are respectively disposed on two ends of a shaft, characterized with simple structure and small size. However, the opening angle of the pivotal portion (the screen) and the relative pivotal portion (the host) are still limited to the factors such as the structures of the rotary (pivot) shafts and the assembling methods of the pivotal portion (the screen) and the relative pivotal portion (the host) connected therewith, hardly to meet pivot requirements (e.g., a pivotal angle often greater than 180 degrees) of modern electronic products (e.g., a tablet personal computer and a connection seat related therewith).

BRIEF SUMMARY OF THE INVENTION

In view of the above-described disadvantages of the conventional rotary (pivot) shaft structure applied with the single shaft, the invention is therefore studied and provided.

The invention mainly provides a double-shaft type rotary shaft pivotal positioning structure to produce an elasticity for guidance when two rotary shafts capable of performing synchronous reverse rotation is pivoted close to a preset positioning angle, thereby enabling the two rotary shafts to be positioned at a preset opening angle and improving conveniences in operation processes.

In order to attain the purpose and efficacy above, the technical means of a double-shaft type rotary shaft pivotal positioning structure of the invention includes an elastic guide assembly, a first pivot shaft and a second pivot shaft. The elastic guide assembly comprises at least one sheet-like elastic guide member. The elastic guide member comprises at least one end portion provided with a hollow containing portion outwardly communicated via a side opening, respectively forming two opposite elastic arms and at least one planed press-contact side on an external circumference and an internal periphery of the containing portion of the elastic guide member. The first and second pivot shafts are parallel to each other. At least one of the first and second pivot shafts is centrally provided with a center section portion utilized to enter the containing portion of the elastic guide member, in which the center section portion comprises a periphery provided with at least one center section planed surface to be correspondingly to and capable of being pressingly contacted with the press-contact side of the elastic guide member, so that, when one of the first and second pivot shafts which is capable of corresponding to the press-contact side of the elastic guide member is pivoted close to a preset angle, each of the two opposite elastic arms is capable of elastically pressing against the center section planed surface of one of the first and second pivot shafts, to thereby produce a driving force to enable the center section planed surface of the pivot shaft to rotatably attach toward the press-contact side of the elastic guide member.

According to the above-described structure, two sides of the press-contact side of the elastic guide member are respectively provided with end convex portions that are capable of being propped against two sides of the corresponding center section planed surfaces of the first and second pivot shafts.

According to the above-described structure, two sides of the side opening of the elastic guide member are respectively provided with side convex portions that are capable of being propped against the corresponding center section portions of the first and second pivot shafts.

According to the above-described structure, two ends of the elastic guide member are symmetrically provided with the containing portions, two opposite elastic arms and two opposite press-contact sides, and the first and second pivot shafts are correspondingly disposed with the center section portions and the center section planed surfaces, and the first and second pivot shafts are correspondingly disposed with the center section portions and the center section planed surfaces.

According to the above-described structure, the elastic guide assembly comprises a plurality of sheet-like elastic guide members that are equalized and mutually stacked.

According to the above-described structure, the double-shaft type rotary shaft pivotal positioning structure further comprises a synchronous linking assembly providing a first socket and a second socket that are capable of performing synchronous reverse rotation and respectively provided with a first joining hole and a second joining hole in the form of a through type, in which each of the center section portions of the first and second pivot shafts is provided with an end joining portion extended toward one end thereof, and the end joining portions of the first and second pivot shafts are utilized to respectively enter the first and second joining holes of the first and second sockets of the synchronous linking assembly, so that the first and second pivot shafts and the first and second sockets are synchronously linked.

According to the above-described structure, each of the end joining portions of the first and second pivot shafts comprises a circumference provided with at least one end planed surface, and the first and second joining holes of the first and second sockets of the synchronous linking assembly respectively have a section structure formed with a shape and an area which are equal to that of the end planed surfaces of the first and second pivot shafts, respectively.

According to the above-described structure, each of the end joining portions of the first and second pivot shafts is provided with a fixation portion that is capable of passing through and outward-protruding from the corresponding first and second joining holes of the first and second sockets of the synchronous linking assembly, and each of the two fixation portions of the first and second pivot shafts is capable of being joined to a fixation member, so that the first and second pivot shafts can be respectively prevented from disengaging from the first and second sockets of the synchronous linking assembly.

According to the above-described structure, the two fixation portions of the first and second pivot shafts are external screw threads, and the fixation members are screw nuts respectively engaged to the external screw threads.

According to the above-described structure, one side of the elastic guide assembly to be distant from the synchronous linking assembly is further provided with a spacing-positioning member which is penetratingly formed with a first shaft hole and a second shaft hole that are respectively corresponding to the first and second joining holes of the first and second sockets of the synchronous linking assembly.

According to the above-described structure, one end of each of the first and second pivot shafts to be distant from the end joining portion thereof is provided with a connection portion that is utilized to respectively connect to a pivotal member and a relative pivotal member.

According to the above-described structure, the elastic guide assembly and the synchronous linking assembly are disposed in a preset containing space of an outer sleeve tube.

According to the above-described structure, a to-be-positioned partition is laterally disposed at the center of the containing space of an outer sleeve tube, and the synchronous linking assembly further comprises a positioning portion that is correspondingly joined to the to-be-positioned partition.

According to the above-described structure, the positioning portion of the synchronous linking assembly and the to-be-positioned partition of the outer sleeve tube are joined by a positioning member.

According to the above-described structure, the to-be-positioned partition of the partition portion is a through hole, the positioning portion of the synchronous linking assembly is a screw hole to be placed next to the through hole of the partition portion, and a positioning member is a bolt utilized to pass through the through hole of the partition portion to screw into the screw hole of the synchronous linking assembly.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
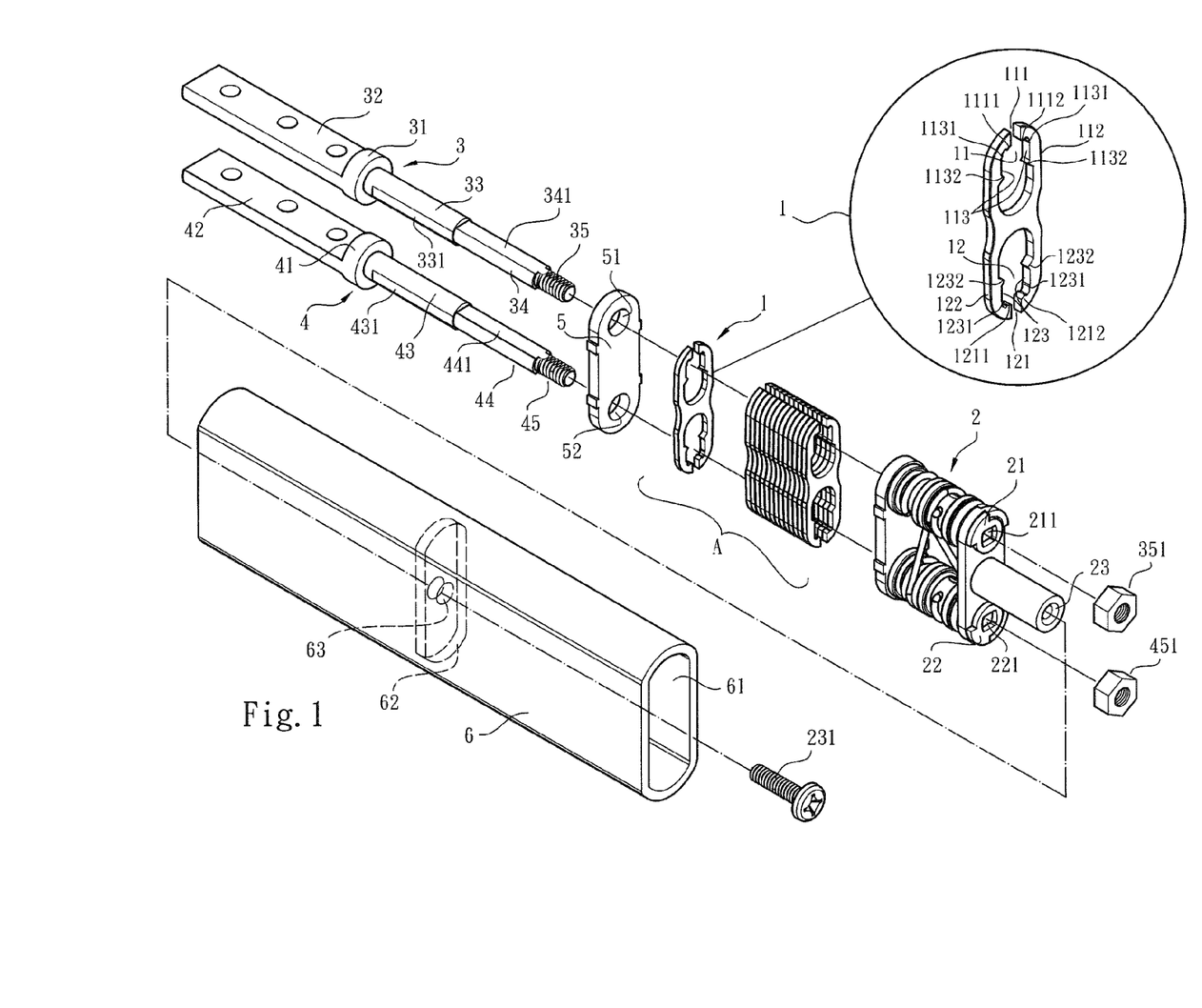
FIG. 1 is an exploded view showing an entire structure of the invention.
Figure 2:
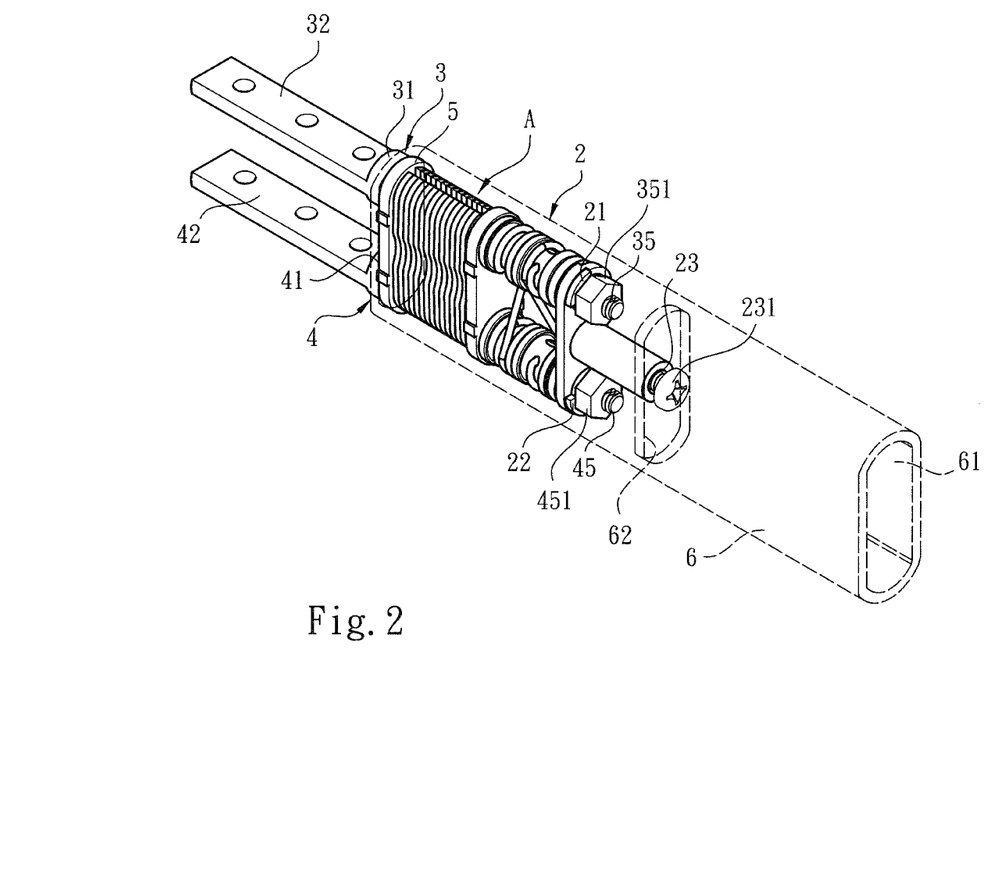
FIG. 2 is a schematic view showing an entire assembly of the invention.
Figure 3:
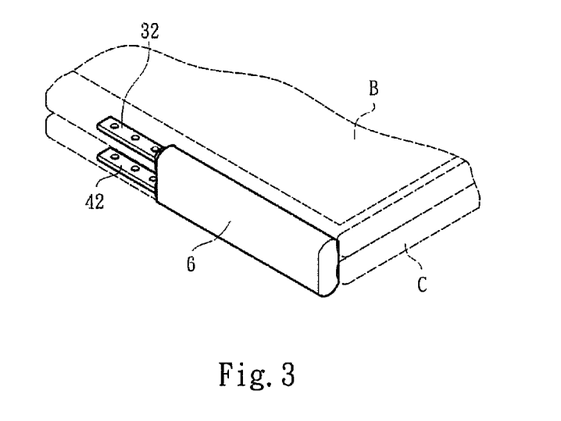
FIG. 3 is a schematic view of a state of the invention which is pivoted to a pivotal member and a relative pivotal member that are covered to each other.

Referring to FIGS. 1 and 2, the structure of a double-shaft type rotary shaft pivotal positioning structure of the invention mainly comprises an elastic guide assembly 'A', a synchronous linking assembly 2, and two pivot shafts 3 and 4 that are equalized and divided into a first pivot shaft 3 and a second pivot shaft 4. Each elastic guide member 1 comprises two end portions, two hollow containing portions 11 and 12 respectively provided on the two end portions, and two side openings 111 and 121 respectively outward-communicating the containing portions 11 and 12, respectively forming two opposite elastic arms 112/112 and two opposite elastic arms 122/122 on external circumferences of the containing portion 11 and 12 of the elastic guide member 1 and respectively forming at least two planed press-contact sides 113/113 and 123/123 on internal peripheries of the containing portion 11 and 12 of the elastic guide member 1. Besides, two sides of each press-contact side 113 and two sides of each press-contact side 123 of the elastic guide member 1 are respectively provided with end convex portions 1131/1132 and 1231/1232, and two sides of the side opening 111 and two sides of the side opening 121 of the elastic guide member 1 are respectively provided with side convex portions 1111/1112 and 1211/1212. In actual applications, the elastic guide assembly 'A' comprises a plurality of same sheet-like elastic guide members 1 that are mutually stacked as required, and the elastic arms 112 and 122 entirely can provide different elastic forces according to the amount of the elastic guide member 1.

The synchronous linking assembly 2 comprises a first socket 21 and a second socket 22, in which the first and second sockets 21 and 22 are capable of performing synchronous reverse rotation and respectively provided with a first joining hole 211 and a second joining hole 221 in the form of a through type.

The first(second) pivot shaft 3(4) comprises an outwardly-protruded stopping portions 31(41) that is centrally arranged, a connection portion 32(42), a center section portion 33(43), an end joining portion 34(44) and a fixation portion 35(45), in which, from one end side of the stopping portion 31(41) the connection portion 32(42) is arranged, from the other end side of the stopping portion 31(41) the center section portion 33(43), the end joining portion 34(44) and the fixation portion 35(45) are sequentially arranged (i.e., the connection portion 32(42) is arranged at one end of the first(second) pivot shaft 3(4) to be distant from the end joining portion 34(44)), and the center section portion 33(43) comprises a periphery provided with at least two corresponding center section planed surfaces 331(431). With respect to the containing portion 11(12), the opposite elastic arms 112/112(122/122) and the opposite press-contact sides 113/113 and 123/123 disposed on the two ends of the elastic guide member 1, the first (second) pivot shaft 3(4) is correspondingly disposed with the center section portions 33(43) and the center section planed surfaces 331 (431). The center section planed surfaces 331(431) of the center section portion 33(43) of the first(second) pivot shaft 3(4) are correspondingly pressingly contacted with the press-contact sides 113/113(123/123) of the elastic guide member 1 (i.e., the press-contact sides 113/113(123/123) of the elastic arms 112/112(122/122) of the elastic guide member 1 can be elastically pressed against the center section planed surfaces 331(431) of the center section portion 33(43) of the first (second) pivot shaft 3(4)) when entering the center section planed surfaces 331(431) of the center section portion 33(43) into the containing portions 11(12) of the elastic guide members 1. That is, when the center section planed surfaces 331 (431) of the center section portion 33(43) is placed into the containing portions 11(12) of the elastic guide members 1, the end convex portions 1131/1132 and 1231/1232 of the elastic guide members 1 are propped against two sides of the corresponding center section planed surfaces 331 and 431 of the first and second pivot shafts 3 and 4, and the side convex portions 1111/1112 and 1211/1212 of the elastic guide members 1 are propped against the corresponding center section portions 33 and 43 of the first and second pivot shafts 3 and 4, thereby forming an elastic force to attain positioning and holding efficiency. The end joining portion 34(44) of the first(second) pivot shaft 3(4) has a section structure formed with a shape and an area which are equal to that of the first(second) joining hole 211(221) of the first(second) socket 21(22) of the synchronous linking assembly 2, so that the end joining portion 34(44) of the first(second) pivot shaft 3(4) and the first(second) joining hole 211(221) of the first(second) socket 21(22) of the synchronous linking assembly 2 can be tightly joined to each other when entering the end joining portion 34(44) of the first(second) pivot shaft 3(4) into the first(second) joining hole 211(221) of the first(second) socket 21(22) of the synchronous linking assembly 2. That is, the end joining portion 34(44) of the first (second) pivot shaft 3(4) is utilized to enter the first(second) joining hole 211(221) of the first(second) socket 21(22) of the synchronous linking assembly 2, so that the first(second) pivot shaft 3(4) and the first (second) socket 21(22) of the synchronous linking assembly 2 are synchronously linked. In actual applications, at least two corresponding end planed surfaces1 341(441) are provided at a circumference of the end joining portion 34(44) of the first(second) pivot shaft 3(4) having a section shape and area equal to that of the first(second) joining hole 211(221) of the first(second) socket 21(22) of the synchronous linking assembly 2, and the fixation portion 35(45) of the first(second) pivot shaft 3(4) is capable of being joined to a fixation member 351(451), in which the two fixation portion 35(45) of the first(second) pivot shaft 3(4) is an external screw thread, and the fixation member 351(451) is a screw nut engaged to the external screw thread.

If necessary, one side of the elastic guide assembly 'A' to be distant from the synchronous linking assembly 2 can be further provided with a spacing-positioning member 5 which is penetratingly formed with a first shaft hole 51 and a second shaft hole 52 that are respectively corresponding to the first and second joining holes 211 and 221 of the first and second sockets 21 and 22 of the synchronous linking assembly 2. In the assembling process, the end joining portions 34 and 44 of the first and second pivot shafts 3 and 4 are respectively utilized to sequentially pass through the first and second shaft holes 51 and 52 of the spacing-positioning member 5, the containing portions 11 and 12 of the elastic guide members 1 of the elastic guide assembly 'A', and the first and second joining holes 211 and 221 of the synchronous linking assembly 2, and finally the fixation members 351 and 451 are joined to the fixation portions 35 and 45 of the first and second pivot shafts 3 and 4. Accordingly, the spacing-positioning member 5, the elastic guide assembly 'A' and the synchronous linking assembly 2 can be stably positioned between the stopping portions 31 and 41 of the first and second pivot shafts 3 and 4 and the fixation members 351 and 451, and the center section portions 33 and 43 of the first and second pivot shafts 3 and 4 can be exactly entered into the containing portions 11 and 12 of the elastic guide members 1.

In the implementation of the above-described structure of the invention, the spacing-positioning member 5, the elastic guide assembly 'A' and the synchronous linking assembly 2 can be disposed in a preset containing space 61 of an outer sleeve tube 6. A partition portion 62 providing a to-be-positioned partition 63 is laterally disposed at the center of the containing space 61 of an outer sleeve tube 6, and the synchronous linking assembly 2 further comprises a positioning portion 23 that is correspondingly joined to the to-be-positioned partition 63 of the partition portion 62. In the disclosed embodiment of the invention, the to-be-positioned partition 63 of the partition portion 62 is a through hole, the positioning portion 23 of the synchronous linking assembly 2 is a screw hole to be placed next to the through hole 62 of the partition portion 62, and a positioning member 231 (e.g., a bolt) 231 is utilized to pass through the through hole 62 of the partition portion 62 to screw into the screw hole 23 of the synchronous linking assembly 2, thereby forming a join positioning efficiency therebetween.

Figure 4:
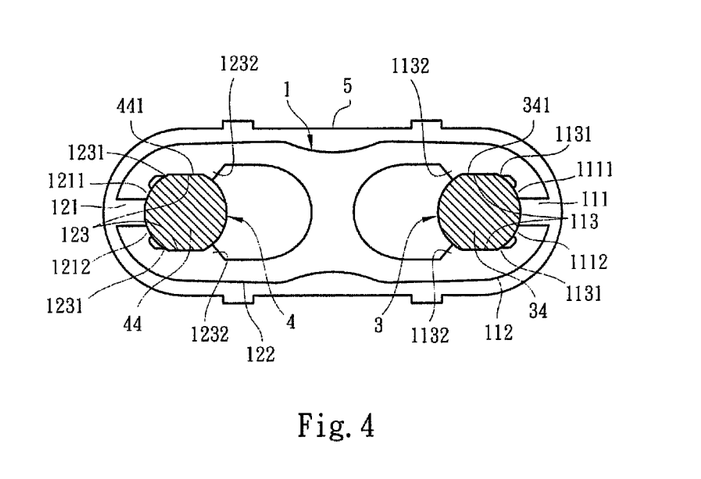
FIG. 4 is a schematic view showing a relative relation of two pivot shafts and an elastic guide assembly of the invention.
Figure 5:
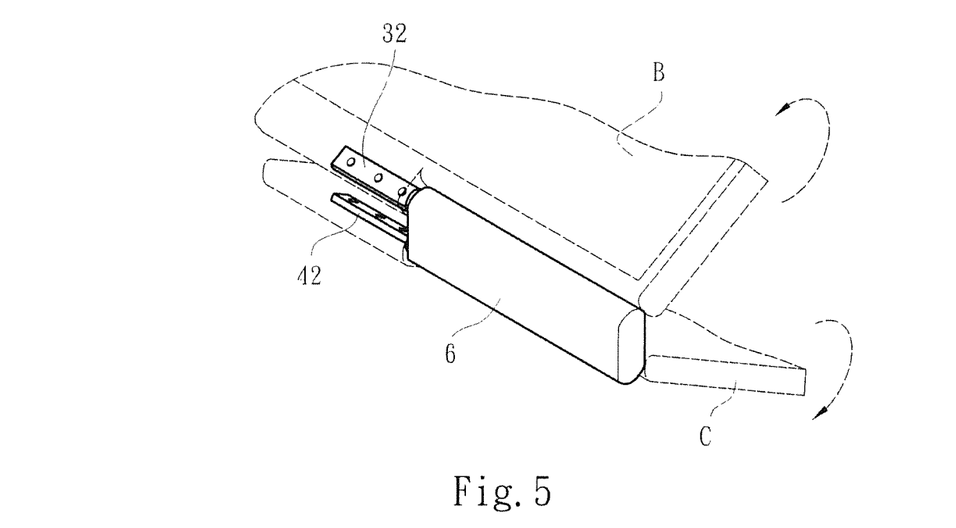
FIG. 5 is a schematic view of a state of the invention which is pivoted to the pivotal member and the relative pivotal member, illustrating that the pivotal member and the relative pivotal member are operated in an opening process.
Figure 6:
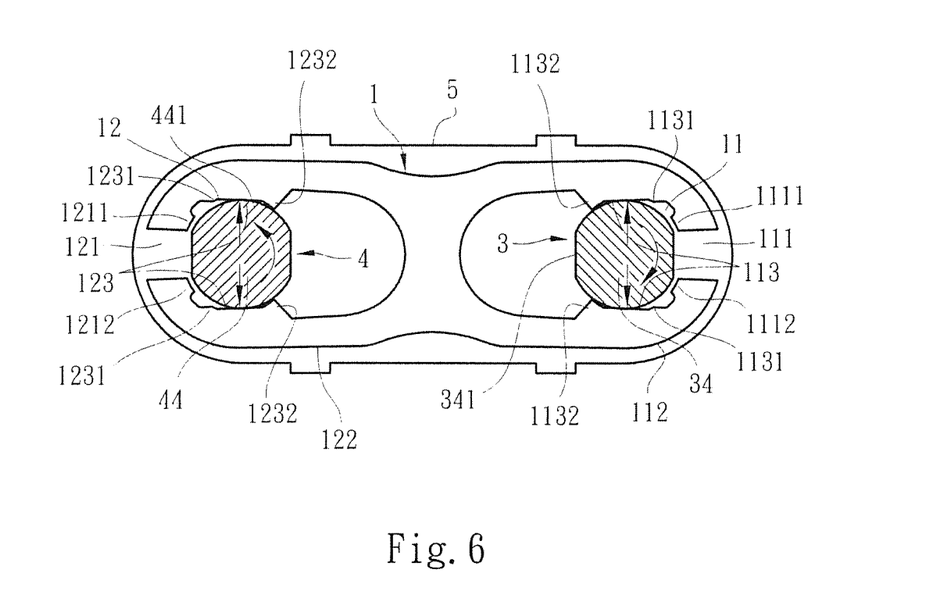
FIG. 6 is a schematic view showing a relative relation of two pivot shafts and an elastic guide assembly of the invention.

Referring to FIGS. 3, 4, 5, 6, 7 and 8, in the application of the invention, when a pivotal member 'B' (e.g., a liquid crystal screen) joined to the first pivot shaft 3 and a relative pivotal member 'C' joined to the second pivot shaft 4 are covered to each other in a storage state (shown in FIG. 3), and the center section portions 33 and 43 of the first and second pivot shafts 3 and 4 are respectively engaged in the containing portions 11 and 12 of the elastic guide members 1 of the elastic guide assembly 'A', by utilizing the center section planed surfaces 331 and 431 of the first and second pivot shafts 3 and 4 to completely prop against the planed press-contact sides 113/113 and 123/123 of the elastic arms 112/112 and 122/122 of the elastic guide members 1 of the elastic guide assembly 'A', respectively. That is, as shown in FIG. 4, the end convex portions 1131 and 1231 of the elastic guide members 1 are respectively propped against the two sides of the center section planed surfaces 331 and 431 of the center section portion 33 and 43 of the first and second pivot shafts 3 and 4, and the side convex portions 1111/1112 and 1211/1212 of the elastic guide members 1 are propped against the center section portions 33 and 43 of the first and second pivot shafts 3 and 4, thereby assuring the first and second pivot shafts 3 and 4 to be stably positioned.

When the pivotal member 'B' and the relative pivotal member 'C' are mutually pivotally opened (shown in FIG. 5), the first and second pivot shafts 3 and 4 are capable of performing synchronous reverse rotation by the synchronous linking assembly 2, the center section planed surfaces 331 and 431 of the first and second pivot shafts 3 and 4 are disengaged from the planed press-contact sides 113/113 and 123/123 of the elastic arms 112/112 and 122/122 of the elastic guide members 1 of the elastic guide assembly 'A', and the center section portions 33 and 43 of the first and second pivot shafts 3 and 4 are propped against the planed press-contact sides 113/113 and 123/123 of the elastic arms 112/112 and 122/122 of the elastic guide members 1 of the elastic guide assembly 'A' (shown in FIG. 6), thereby enabling the two sets of elastic arms 112/112 and 122/122 to be outwardly extended in a tension state.

Figure 7:
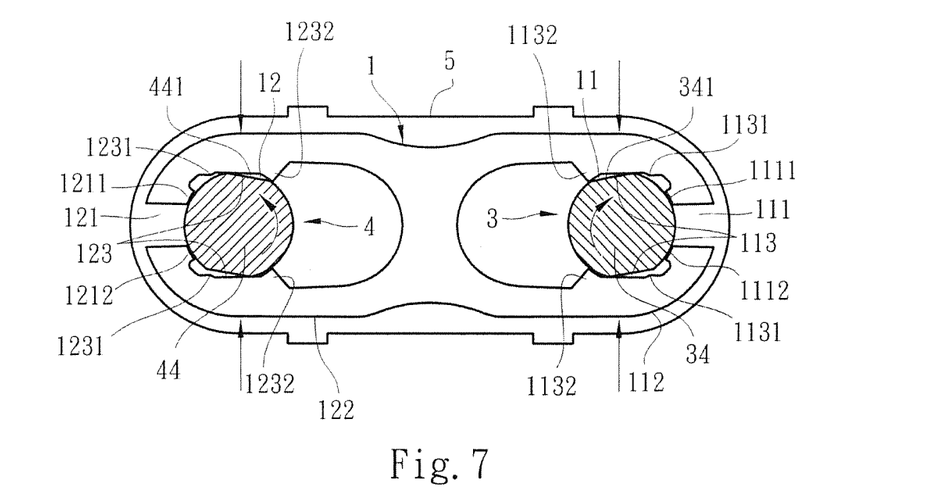
FIG. 7 is a schematic view showing a relative relation of two pivot shafts and an elastic guide assembly of the invention.
Figure 8:
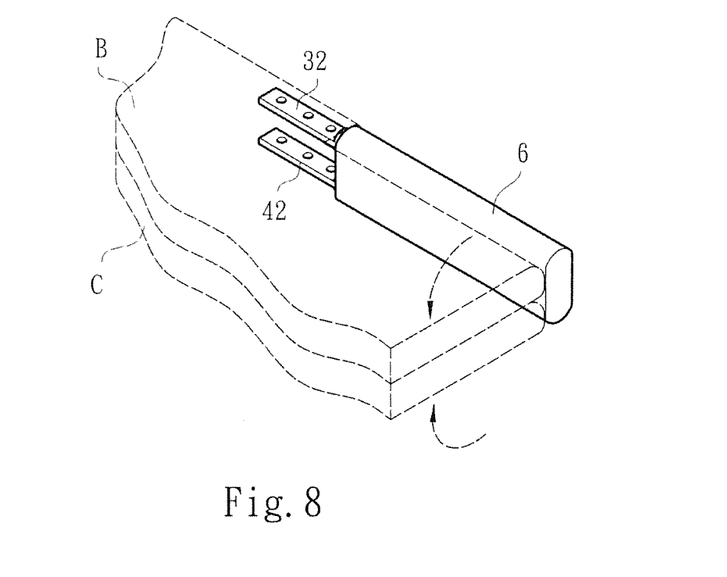
FIG. 8 is a schematic view of a state of the invention which is pivoted to the pivotal member and the relative pivotal member, illustrating that the pivotal member and the relative pivotal member are in a fully-opened position.

When the first and second pivot shafts 3 and 4 are pivoted close to a preset positioning angle (e.g., 180 degrees defined in the disclosed embodiment, as shown in FIG. 7), the planed press-contact sides 113/113 and 123/123 of the elastic arms 112/112 and 122/122 of the elastic guide members 1 of the elastic guide assembly 'A' are partially contacted with the center section planed surfaces 331 and 431 of the center section portion 33 and 43 of the first and second pivot shafts 3 and 4, and the first and second pivot shafts 3 and 4 are continuously pivoted to the positioning angle by the elastic force of the elastic arms 112/112 and 122/122 of the elastic guide members 1 of the elastic guide assembly 'A'; meanwhile, the side convex portions 1111/1112 and 1211/1212 and the end convex portions 1132 and 1232 are respectively pressed against the center section portions 33 and 43 of the first and second pivot shafts 3 and 4 to form a sliding guiding efficiency to cause the planed press-contact sides 113/113 and 123/123 of the elastic arms 112/112 and 122/122 of the elastic guide members 1 of the elastic guide assembly 'A' to be completely pressingly contacted with the center section planed surfaces 331 and 431 of the center section portion 33 and 43 of the first and second pivot shafts 3 and 4 (shown in FIG. 8), enabling the first pivot shaft 3 (the pivotal member 'B') and the second pivot shaft 4 (the relative pivotal member 'C') to automatically continuously pivot and be fixed at the preset positioning angle.

In conclusion, with the configuration of the double-shaft type rotary shaft pivotal positioning structure of the invention, an elasticity for guidance can be produced when the two rotary shafts capable of performing synchronous reverse rotation is pivoted close to the preset positioning angle, thereby attaining an efficacy of enabling the two rotary shafts to be automatically positioned at a preset opening angle. While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A double-shaft rotary shaft pivotal positioning structure, comprising:
   an elastic guide assembly including at least one substantially planar elastic guide member, the elastic guide member comprising at least one end portion provided with a hollow containing portion outwardly communicated via a side opening, respectively forming two opposite elastic arms and at least one planed press-contact side on an external circumference and an internal periphery of the containing portion of the elastic guide member; and
   a first pivot shaft and a second pivot shaft that are parallel to each other, at least one of which being centrally provided with a center section portion utilized to enter the containing portion of the elastic guide member, the center section portion comprising a periphery provided with at least one center section planed surface to be corresponding to and capable of being contacted with the press-contact side of the elastic guide member, so that, when one of the first and second pivot shafts which is capable of corresponding to the press-contact side of the elastic guide member is pivoted close to a preset angle, each of the two opposite elastic arms is capable of elastically pressing against the center section planed surface of one of the first and second pivot shafts, to thereby produce a driving force to enable the center section planed surface of the pivot shaft to rotatably attach toward the press-contact side of the elastic guide member.

2. The double-shaft rotary shaft pivotal positioning structure as claimed in claim 1, wherein the first and second pivot shafts being provided with center section planed surfaces and two sides of the press-contact side of the elastic guide member are respectively provided with end convex portions that are capable of being propped against two sides of the corresponding center section planed surfaces of the first and second pivot shafts.

3. The double-shaft rotary shaft pivotal positioning structure as claimed in claim 2, wherein two sides of the side opening of the elastic guide member are respectively provided with side convex portions that are capable of being propped against the corresponding center section portions of the first and second pivot shafts.

4. The double-shaft rotary shaft pivotal positioning structure as claimed in claim 1, wherein two ends of the elastic guide member are symmetrically provided with the containing portions, two opposite elastic arms and two opposite press-contact sides, and the first and second pivot shafts are correspondingly disposed with the center section portions and the center section planed surfaces.

5. The double-shaft rotary shaft pivotal positioning structure as claimed in claim 2, wherein two ends of the elastic guide member are symmetrically provided with the containing portions, two opposite elastic arms and two opposite press-contact sides, and the first and second pivot shafts are correspondingly disposed with the center section portions and the center section planed surfaces.

6. The double-shaft rotary shaft pivotal positioning structure as claimed in claim 3, wherein two ends of the elastic guide member are symmetrically provided with the containing portions, two opposite elastic arms and two opposite press-contact sides, and the first and second pivot shafts are correspondingly disposed with the center section portions and the center section planed surfaces.

7. The double-shaft rotary shaft pivotal positioning structure as claimed in claim 1, wherein the elastic guide assembly comprises a plurality of same substantially planar elastic guide members that are mutually stacked.

8. The double-shaft rotary shaft pivotal positioning structure as claimed in claim 2, wherein the elastic guide assembly comprises a plurality of same substantially planar elastic guide members that are mutually stacked.

9. The double-shaft rotary shaft pivotal positioning structure as claimed in claim 3, wherein the elastic guide assembly comprises a plurality of same substantially planar elastic guide members that are mutually stacked.

10. The double-shaft rotary shaft pivotal positioning structure as claimed in claim 1 further comprising a synchronous linking assembly providing a first socket and a second socket that are capable of performing synchronous reverse rotation and respectively provided with a first joining hole and a second joining hole in the form of throughholes, each of the center section portions of the first and second pivot shafts is provided with an end joining portion extended toward one end thereof, and the end joining portions of the first and second pivot shafts are utilized to respectively enter the first and second joining holes of the first and second sockets of the synchronous linking assembly, so that the first and second pivot shafts and the first and second sockets are synchronously linked.

11. The double-shaft rotary shaft pivotal positioning structure as claimed in claim 2 further comprising a synchronous linking assembly providing a first socket and a second socket that are capable of performing synchronous reverse rotation and respectively provided with a first joining hole and a second joining hole in the form of throughholes, each of the center section portions of the first and second pivot shafts is provided with an end joining portion extended toward one end thereof, and the end joining portions of the first and second pivot shafts are utilized to respectively enter the first and second joining holes of the first and second sockets of the synchronous linking assembly, so that the first and second pivot shafts and the first and second sockets are synchronously linked.

12. The double-shaft rotary shaft pivotal positioning structure as claimed in claim 3 further comprising a synchronous linking assembly providing a first socket and a second socket that are capable of performing synchronous reverse rotation and respectively provided with a first joining hole and a second joining hole in the form of throughholes, each of the center section portions of the first and second pivot shafts is provided with an end joining portion extended toward one end thereof, and the end joining portions of the first and second pivot shafts are utilized to respectively enter the first and second joining holes of the first and second sockets of the synchronous linking assembly, so that the first and second pivot shafts and the first and second sockets are synchronously linked.

13. The double-shaft rotary shaft pivotal positioning structure as claimed in claim 7 further comprising a synchronous linking assembly providing a first socket and a second socket that are capable of performing synchronous reverse rotation, the first socket and the second socket are respectively provided with a first joining hole and a second joining hole that are formed of throughholes, each of the center section portions of the first and second pivot shafts is provided with an end joining portion extended toward one end thereof, and the end joining portions of the center section portions of the first and second pivot shafts are utilized to respectively enter the first and second joining holes of the first and second sockets of the synchronous linking assembly, so that the first and second pivot shafts and the first and second sockets are synchronously linked.

14. The double-shaft rotary shaft pivotal positioning structure as claimed in claim 10 wherein each of the end joining portions of the first and second pivot shafts comprises a circumference provided with at least one end planed surface, and the first and second joining holes of the first and second sockets of the synchronous linking assembly respectively have a section structure formed with a shape and an area which are equal to that of the end planed surfaces of the first and second pivot shafts, respectively.

15. The double-shaft rotary shaft pivotal positioning structure as claimed in claim 11, wherein each of the end joining portions of the first and second pivot shafts comprises a circumference provided with at least one end planed surface, and the first and second joining holes of the first and second sockets of the synchronous linking assembly respectively have a section structure formed with a shape and an area which are equal to that of the end planed surfaces of the first and second pivot shafts, respectively.

16. The double-shaft rotary shaft pivotal positioning structure as claimed in claim 13, wherein each of the end joining portions of the first and second pivot shafts comprises a circumference provided with at least one end planed surface, and the first and second joining holes of the first and second sockets of the synchronous linking assembly respectively have a section structure formed with a shape and an area which are equal to that of the end planed surfaces of the first and second pivot shafts.

17. The double-shaft rotary shaft pivotal positioning structure as claimed in claim 10, wherein each of the end joining portions of the first and second pivot shafts is provided with a fixation portion that is capable of passing through and outward-protruding from the corresponding first and second joining holes of the first and second sockets of the synchronous linking assembly, and each of the two fixation portions of the first and second pivot shafts is capable of being joined to a fixation member, so that the first and second pivot shafts being respectively prevented from disengaging from the first and second sockets of the synchronous linking assembly.

18. The double-shaft rotary shaft pivotal positioning structure as claimed in claim 11, wherein each of the end joining portions of the first and second pivot shafts is provided with a fixation portion that is capable of passing through and outward-protruding from the corresponding first and second joining holes of the first and second sockets of the synchronous linking assembly, and each of the two fixation portions of the first and second pivot shafts is capable of being joined to a fixation member, so that the first and second pivot shafts being respectively prevented from disengaging from the first and second sockets of the synchronous linking assembly.

19. The double-shaft rotary shaft pivotal positioning structure as claimed in claim 14, wherein each of the end joining portions of the first and second pivot shafts is provided with a fixation portion that is capable of passing through and outward-protruding from the corresponding first and second joining holes of the first and second sockets of the synchronous linking assembly, and each of the two fixation portions of the first and second pivot shafts is capable of being joined to a fixation member, so that the first and second pivot shafts being respectively prevented from disengaging from the first and second sockets of the synchronous linking assembly.

20. The double-shaft rotary shaft pivotal positioning structure as claimed in claim 17, wherein the two fixation portions of the first and second pivot shafts are external screw threads, and the fixation members are screw nuts respectively engaged to the external screw threads.

21. The double-shaft rotary shaft pivotal positioning structure as claimed in claim 19, wherein the two fixation portions of the first and second pivot shafts are external screw threads, and the fixation members are screw nuts respectively engaged to the external screw threads.

22. The double-shaft rotary shaft pivotal positioning structure as claimed in claim 10, wherein one side of the elastic guide assembly to be distant from the synchronous linking assembly is further provided with a spacing-positioning member which is penetratingly formed with a first shaft hole and a second shaft hole that are respectively corresponding to the first and second joining holes of the first and second sockets of the synchronous linking assembly.

23. The double-shaft rotary shaft pivotal positioning structure as claimed in claim 11, wherein one side of the elastic guide assembly to be distant from the synchronous linking assembly is further provided with a spacing-positioning member which is penetratingly formed with a first shaft hole and a second shaft hole that are respectively corresponding to the first and second joining holes of the first and second sockets of the synchronous linking assembly.

24. The double-shaft rotary shaft pivotal positioning structure as claimed in claim14, wherein one side of the elastic guide assembly to be distant from the synchronous linking assembly is further provided with a spacing-positioning member which is penetratingly formed with a first shaft hole and a second shaft hole that are respectively corresponding to the first and second joining holes of the first and second sockets of the synchronous linking assembly.

25. The double-shaft rotary shaft pivotal positioning structure as claimed in claim 17, wherein one side of the elastic guide assembly to be distant from the synchronous linking assembly is further provided with a spacing-positioning member which is penetratingly formed with a first shaft hole and a second shaft hole that are respectively corresponding to the first and second joining holes of the first and second sockets of the synchronous linking assembly.

26. The double-shaft rotary shaft pivotal positioning structure as claimed in claim 10, wherein one end of each of the first and second pivot shafts to be distant from the end joining portion thereof is provided with a connection portion that is utilized to respectively connect to a pivotal member and a relative pivotal member.

27. The double-shaft rotary shaft pivotal positioning structure as claimed in claim 11, wherein one end of each of the first and second pivot shafts to be distant from the end joining portion thereof is provided with a connection portion that is utilized to respectively connect to a pivotal member and a relative pivotal member.

28. The double-shaft rotary shaft pivotal positioning structure as claimed in claim 14, wherein one end of each of the first and second pivot shafts to be distant from the end joining portion thereof is provided with a connection portion that is utilized to respectively connect to a pivotal member and a relative pivotal member.

29. The double-shaft rotary shaft pivotal positioning structure as claimed in claim 17, wherein one end of each of the first and second pivot shafts to be distant from the end joining portion thereof is provided with a connection portion that is utilized to respectively connect to a pivotal member and a relative pivotal member.

30. The double-shaft rotary shaft pivotal positioning structure as claimed in claim 22, wherein one end of each of the first and second pivot shafts to be distant from the end joining portion thereof is provided with a connection portion that is utilized to respectively connect to a pivotal member and a relative pivotal member.

31. The double-shaft rotary shaft pivotal positioning structure as claimed in claim 10, wherein the elastic guide assembly and the synchronous linking assembly are disposed in a preset containing space of an outer sleeve tube.

32. The double-shaft rotary shaft pivotal positioning structure as claimed in claim 11, wherein the elastic guide assembly and the synchronous linking assembly are disposed in a preset containing space of an outer sleeve tube.

33. The double-shaft rotary shaft pivotal positioning structure as claimed in claim 14, wherein the elastic guide assembly and the synchronous linking assembly are disposed in a preset containing space of an outer sleeve tube.

34. The double-shaft rotary shaft pivotal positioning structure as claimed in claim 17, wherein the elastic guide assembly and the synchronous linking assembly are disposed in a preset containing space of an outer sleeve tube.

35. The double-shaft rotary shaft pivotal positioning structure as claimed in claim 22, wherein the elastic guide assembly and the synchronous linking assembly are disposed in a preset containing space of an outer sleeve tube.

36. The double-shaft rotary shaft pivotal positioning structure as claimed in claim 26, wherein the elastic guide assembly and the synchronous linking assembly are disposed in a preset containing space of an outer sleeve tube.

\* \* \* \* \*